(No Model.)

J. TULLIUS.
BICYCLE.

No. 561,146. Patented June 2, 1896.

WITNESSES:
Fred White
Thomas F. Wallace

INVENTOR:
Julius Tullius,
By his Attorneys,
Arthur C. Fraser &Co.

UNITED STATES PATENT OFFICE.

JULIUS TULLIUS, OF NEW YORK, N. Y.

BICYCLE.

SPECIFICATION forming part of Letters Patent No. 561,146, dated June 2, 1896.

Application filed April 6, 1895. Serial No. 544,700. (No model.)

*To all whom it may concern:*

Be it known that I, JULIUS TULLIUS, a citizen of the United States, residing in the city, county, and State of New York, have invented certain new and useful Improvements in Bicycles and Similar Machines, of which the following is a specification.

This invention relates to motive power for bicycles, tricycles, or other vehicles, and particularly to mechanism for applying this power in which the pedal-cranks can be coupled with or uncoupled from the driving-gear, and aims to provide certain improvements in such mechanism.

In variable gearing for bicycles it is usual to couple the pedals to one or other of two sprocket-wheels or differential gears, so that when one is so coupled the machine may be driven for speed and when the other is the one coupled to the crank the gearing may be used for power propulsion. Examples of such structures are shown in my Letters Patent No. 530,911, dated December 11, 1894, and in my application for patent filed March 2, 1895, Serial No. 540,326.

My present improvements can be utilized in connection with the driving-gear of any variable-gear bicycle or analogous vehicle, but are especially applicable to machines of the general character shown in my said patent and application and will be described as applied to such machines.

My present invention aims to simplify and strengthen the coupling for the gearing and the adjacent structural features of the parts, provide improved means for effecting the coupling and uncoupling, and provide a variable driving-gear involving no increase in the width of the shaft-bearing and avoiding the necessity of axial movement of the pedals or their shaft. To this end in carrying out the preferred form of the invention I use in connection with the frame-bearing and driving-gear a pedal-shaft independently rotative in but substantially stationary axially of the bearing and gearing, and provide a coupling concentric with, rotative with, and preferably embracing and surrounding the exterior of the crank-shaft, having clutching provisions at its opposite ends opposed to and adapted to reciprocate with corresponding provisions on or connected to the respective gears when in operation and lying within these gears when in the inactive position, and I provide an operating-lever for this coupling within the frame and improved means extending from this lever to the upper and forward or other suitable part of the frame for controlling and moving it and certain other improvements which will be hereinafter fully set forth.

Figure 1:
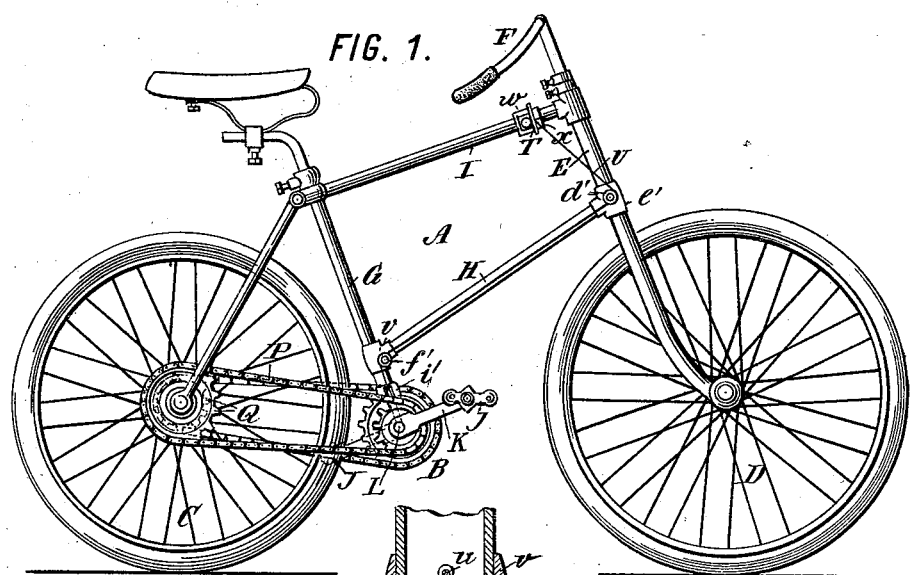
Figure 5:
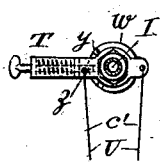
Figure 2:
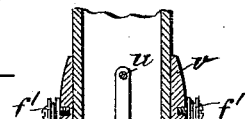
Figure 6:
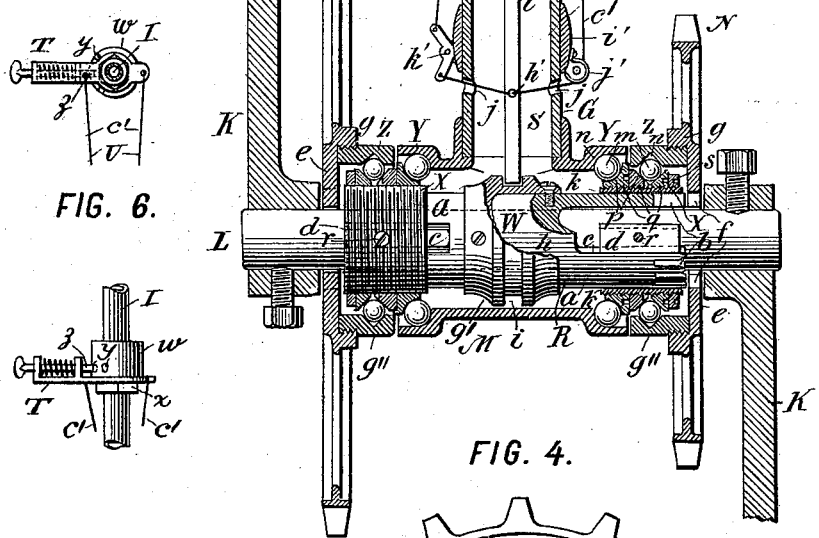
Figure 3:
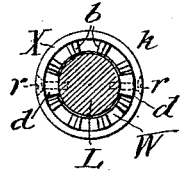
Figure 4:
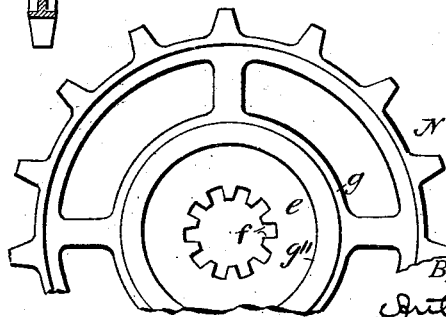

In the accompanying drawings, which illustrate the preferred form of my improvements as applied to a bicycle, Figure 1 is a side elevation of a bicycle. Fig. 2 is an enlarged fragmentary vertical axial section thereof on the line of the crank-shaft. Fig. 3 is an end view of the shaft and coupling, the shaft being in section. Fig. 4 is a fragmentary inner side elevation of the power sprocket-wheel. Fig. 5 is a fragmentary front elevation of the handle for operating the shifting mechanism, on a larger scale than Fig. 1; and Fig. 6 is a fragmentary plan view thereof.

Referring to the drawings, let A indicate the frame of a bicycle, B the driving-gear, C the rear wheel, D the front wheel, E the front post, F the handles, G the saddle-post, H the bottom brace, I the top brace, J the pedals, K their cranks, L the crank-shaft, and M the socket, sleeve, or bearing of the frame embracing the shaft and connecting the latter thereto. These parts may be of any suitable construction, those shown being in general of well-known form. The driving-gear is that usually employed for variable-gear bicycles, and comprises a small power sprocket wheel or gear N and a large speed sprocket wheel or gear O, each capable of rotating independently of or of being coupled to to rotate with the shaft L, and each geared to the axle of the wheel C, in the construction shown, by sprocket-chains P, running over sprocket-pulleys Q on the shaft of the wheel C. A coupling R when in one position locks one wheel to the shaft, when in the other position locks the other wheel thereto, and when in the mid-position leaves these several parts capable of independent operation. When the power-gear is locked to the shaft, the rotation of the wheel C is relatively reduced, while the power applied thereto is relatively increased in proportion to the movement and power given to the pedals. When the speed-gear is the one coupled to the shaft, the speed of rotation of the wheel C when driven thereby is increased, but a corresponding loss of power results. When the coupling is in the mid-position, the pedals may rest stationary as the gears rotate with the running of the wheel C. The coupling is shifted by a shifter S, operated by a shifter-operator T, on the upper part of the frame A, through the medium of a connection U.

I will now describe the preferred adaptation of my improvements.

According to one feature of my invention, I provide an improved coupling between the pedal-shaft and driving-gear. This is preferably constructed as shown in Figs. 2, 3, and 4, wherein the coupling R consists of two reciprocal parts, the one carried by or connected to to move with the pedals or their shaft and the other carried by or connected to to move with the gear to be driven, the former consisting of a wholly or partially cylindrical or tubular sleeve W, embracing the central portion of the shaft, surrounding the latter, concentric therewith, rotating therewith, and movable axially thereof, and the latter consisting of a part fixed to the gear to be coupled in the path of axial movement of the other, and engaged thereby when the parts are moved together in such manner that the shaft and gear are locked to rotate with each other. The sleeve W is preferably a tube movably fitting over the shaft and having bifurcated ends $a$, carrying outwardly-projecting teeth or faces $b$, and separated diametrically or in other suitable manner by longitudinal slots $c$, which embrace keys or other guiding and locking blocks $d$, carried by the shaft L in such manner that the sleeve must rotate with the shaft but can slide thereon, the slots $c$ being long enough to permit the requisite sliding of the sleeve.

The reciprocal portion of the coupling carried by the gear preferably consists of an inwardly-extending wall $e$ on the gear having teeth or faces $f$, disposed in a circular or partly circular arrangement in the path of and opposite the teeth $b$ of the sleeve, which faces reciprocate with each other when the teeth of the sleeve are moved into engagement with the teeth of the wall. The wall $e$ is preferably an integral part of the gear, extending from its hub $g'$ inwardly close to the periphery of the shaft L and having a flat outer face, and the adjacent sides of the teeth or faces $b$ and $f$ are preferably beveled or rounded to facilitate their interengagement. Intermediate of its ends the sleeve has preferably a continuous central body portion $h$, formed with a groove $i$, engaged by the shifter S to facilitate operation of the coupling. For convenience the groove $i$ is formed on a separate ring $g$, surrounding the sleeve W, and fastened thereto by screws or otherwise.

My invention provides an improved bearing between the frame and pedal-shaft and for the driving-gear or gears especially adapted to permit the use of a coupling mounted upon the shaft and working through such bearings. In carrying out this part of the invention I provide an annular bearing-piece X, fixed to and rotating with the shaft, but disposed radially therefrom to a sufficient extent to permit longitudinal recesses or passages $k$ between the bearing-piece and shaft for the location and operation of the coupling member carried by the shaft. The bearing members X are preferably tubular parts having smooth cylindrical interiors and screw-threaded exteriors and are supported at one or more points from the shaft by any suitable means—as, for example, by the blocks $d$, fitting between the shaft and bearing-pieces at diametrically opposite points. The pieces, blocks, and shaft are preferably fixed together by screws $r$. The spaces $k$ between the shaft and bearing-pieces and their connecting-blocks are then arc-shaped passages, which in the construction shown are substantially filled by the outwardly-projecting ends of the sleeve W, which ends enter and move in these spaces. Ball-bearings Y are provided between the socket-piece M of the frame and the bearing-piece X of the shaft and ball-bearings Z between the bearing-piece and the driving-gear, so that each of these parts is positively connected to the shaft by a rotative connection, through which the coupling may be operated. The bearings Y and Z consist of the usual balls $m$, running on seats $n$ at their outer sides and on seats $p$, carried on the bearing-piece X, at their inner sides. The seats $p$ are formed on ring-shaped pieces $q$, having internal screw-threads screwing on the piece X, and the last of these pieces $q$ is locked in place on the piece X by a set-nut $s$. The bearings Y are formed in the outwardly-cupped ends of the piece N and the bearings Z in the inwardly-cupped rings $g''$, screwed on the hubs $g'$ of the driving-gears, and the adjacent edges of these cupped parts are brought sufficiently close together to avoid danger of entry of dust into the bearings. At their outer sides the gears are approached so closely by the inner walls of the hubs of the cranks K, which hubs cover the apertures between the teeth or faces $f$, that danger of the entry of dust at these points is avoided, and thus there is no necessity for providing dust-caps at the bearings of the shaft or gears.

In the construction shown the crank-shaft is substantially immovable axially, relatively to the frame and gears, and the movement of the clutch member on it suffices for the various coupling operations. This arrangement permits a construction whereby the width of the running-gear at the shaft may be comparatively slight, and no lateral movement of the pedals is required to shift the gearing.

My invention provides an improved shifter and improved means for operating it. The improved shifter consists of a rod $t$, having a stiff lower end engaging the groove $i$ of the sleeve W to shift the latter, and a reduced upper end fulcrumed by a pin $u$ to the joint bracket $v$, disposed within the upright brace G, and swinging laterally therein to shift the movable member of the coupling. The improved means for operating this shifter consist of the operating-lever T and the connection U between the latter and the shifter. The lever-key is pivoted on a ring $w$ on the upper framework, preferably on the top brace, where it is held by a nut $x$. The ring has a plurality of notches $y$ at one side. The lever has a spring-catch $z$, which snaps into one or other of these notches to hold the lever in its several positions. The connection U consists of cords or equivalent provisions $c'$ between the lever and shifter, two cords being shown connected to the lever equidistantly apart at opposite sides of its fulcrum, extending downwardly and passing over pulleys $d'$ on the sides of the union $e'$ between the front post E and the lower brace H, and thence rearwardly and over pulleys $f'$ on the bracket $v$, thence downwardly and through apertures $j$ to the rod $t$, to which they are connected by means of a pin $h'$ or in other suitable manner. To carry the cords $c'$ through the holes $j$, any suitable provision may be employed; but I prefer to put a ring $i'$ on the post G, and for one of the cords to mount a pulley $j'$ on this ring, over which the cord runs, and for the other cord to employ a bell-crank lever $k'$, fulcrumed on the ring, to the ends of which lever this cord is connected, as best seen in Fig. 2.

When the lever T is shifted to the mid-position, the shifter S is maintained centrally within the post G and holds the sleeve W out of engagement with each of the gears. Tilting the lever in one direction throws the shifter to one side, causing it to operate the coupling and lock the shaft and one of the gears together. Tilting it in the other direction throws the shifter to the other side and effects the locking of the other gear to the shaft after the freeing of the gear previously locked.

It will be seen that my invention provides improvements in motive power for bicycles and like machines which can be conveniently and advantageously availed of, and it will be understood that the invention is not limited to the particular details of construction and arrangement, nor to use with the particular character of machine set forth and shown; but that the invention may be availed of in whole or part according to such modification as circumstances or the judgment of those skilled in the art may dictate without departing from the spirit of the invention.

What I claim is—

In bicycles and the like, a frame having a socket-piece M having internal ball-bearings, in combination with a pedal-shaft rotative in said piece M, a driving-gear, having internal ball-bearings adjacent to said piece, surrounding said shaft and rotative independently thereof, and having radial teeth $f$ remote from and inwardly of said bearings and around said shaft, an annular bearing-ring X surrounding, concentric with, and rigidly supported from, said shaft, having internal longitudinal spaces $k$ opposite and communicating between the teeth $f$ and the interior of the socket-piece, and having on its exterior two ball-bearing tracks, the one reciprocal to and adjustable toward the ball-bearing of the socket-piece and the other reciprocal to the ball-bearing of the gear, said ring and bearings holding said gear, shaft and socket-piece against relative axial movement, and a clutch carried by the shaft, rotating therewith and movable longitudinally independently thereof, extending through the space $k$ from the inner side to the outer side of the ring X past the bearings of the socket-piece and gear, and having at its outer end teeth $b$ engaging with the teeth $f$ of the gear when the clutch is moved through the ring, and thereby locking the gear and shaft together, substantially as and for the purpose set forth.

In witness whereof I have hereunto signed my name in the presence of two subscribing witnesses.

JULIUS TULLIUS.

Witnesses:
GEORGE H. FRASER,
THOMAS F. WALLACE.